United States Patent [19]
Higley

[11] Patent Number: 5,224,105
[45] Date of Patent: Jun. 29, 1993

[54] TRANSFER OF DATA WITHOUT LOSS OVER A NOISY CHANNEL

[75] Inventor: Paul D. Higley, Plano, Tex.

[73] Assignee: Atlantic Richfield Company, Los Angeles, Calif.

[21] Appl. No.: 587,886

[22] Filed: Sep. 25, 1990

[51] Int. Cl.[5] ............................................. H04L 1/18
[52] U.S. Cl. ........................................ 371/32; 371/33
[58] Field of Search .................................... 371/32, 33

[56] References Cited

U.S. PATENT DOCUMENTS

| | | | |
|---|---|---|---|
| 3,381,272 | 4/1968 | Pasini | 371/32 |
| 3,754,211 | 8/1973 | Rocher et al. | 371/33 |
| 3,956,589 | 5/1976 | Weathers et al. | 371/32 |
| 4,082,922 | 4/1978 | Chu | 371/33 |
| 4,347,603 | 8/1987 | Jacob et al. | 371/32 |
| 4,352,103 | 9/1982 | Slater | 371/33 |
| 4,422,171 | 12/1983 | Wortley et al. | 371/32 |
| 4,439,859 | 3/1984 | Donnan | 371/32 |
| 4,584,684 | 4/1986 | Nagasawa et al. | 371/33 |
| 4,779,274 | 10/1988 | Takahashi et al. | 371/32 |

*Primary Examiner*—Charles E. Atkinson
*Attorney, Agent, or Firm*—Joseph E. Rogers

[57] ABSTRACT

A system is provided for communicating high bandwidth data from a remotely operated semi-submersible vehicle to a mothership surface vessel. The data transmitted from the remotely operated vehicle is blocked and coded to improve the accuracy of the transmission. The remotely operated vehicle contains a large buffer for temporarily storing hydrophone data until it has been transmitted and acknowledged by the mothership. Each transmitted block is acknowledged by the mothership when it has been correctly received. Incorrect or missing acknowledgment signals indicate that some type of interference or outage has occurred in the communications channel. In such an event, the remotely operated vehicle can continually resend the recently transmitted data until receipt of correct acknowledgment signals indicates that the communications channel has been restored.

20 Claims, 8 Drawing Sheets

TRANSFER OF DATA WITHOUT LOSS OVER A NOISY CHANNEL

CROSS REFERENCE TO RELATED APPLICATIONS

The present application contains subject matter in common with related U.S. patent application Ser. No. 384,318, filed Jul. 24, 1989, titled SEMISUBMERSIBLE REMOTELY OPERATED VEHICLE AND METHOD, by Lawrence B. Sullivan, and assigned to the assignee hereof, which is hereby incorporated by reference.

BACKGROUND OF THE INVENTION

1. Field of the Invention

The present invention relates generally to communication systems, and more specifically to a communications system suitable for transmitting data between a remotely operated semi-submersible vehicle and a data gathering ship.

2. Description of the Prior Art

Marine seismic operations are typically conducted by providing a surface vessel which tows a long streamer cable through the water. A plurality of marine pressure geophones (commonly referred to as hydrophones) are mounted along the streamer at spaced intervals. The streamer is made neutral buoyant at a desired depth, typically on the order of 10–20 meters below the surface of the surrounding body of water. The length of the streamer being towed by the surface vessel can be as long as several thousand meters. An energy source can be carried by the surface vessel in order to produce aquatic waves that generate the necessary seismic reflections which are detected by the hydrophones. The data so gathered is recorded and processed to generate a seismic profile.

There are inherent technical and economic limitations to gathering marine seismic data through the use of a surface vessel to tow a single streamer cable. At the present time, multiple streamers are commonly towed behind surface seismic vessels in an effort to acquire more reflection data during a single seismic run. A technical disadvantage of the marine streamer method as presently practiced is that it cannot be employed to produced a so called "split spread" wherein the shot point is at, or perpendicularly offset from, the center of the hydrophones deployed in the water on a single path. A further limitation of prior techniques using single streamer cables is the difficulty of acquiring three dimensional seismic data. The amount and usefulness of data which can be obtained from a streamer towed behind a vessel which is also the sound source is limited.

The cross referenced application, SEMISUBMERSIBLE REMOTELY OPERATED VEHICLE AND METHOD, incorporated herein by reference, describes a design for a remotely operated semi-submersible vehicle which can be used for towed hydrophone streamers. Multiple streamers may be positioned to both sides of the main surface vessel, often referred to as a mothership, in order to obtain improved seismic profiles. The advantage of using such a system will become immediately apparent to those skilled in the art.

The data gathered by the hydrophones must be communicated to the mothership for processing and storage. Since each hydrophone streamer is attached to an independently piloted semi-submersible vehicle, no direct electrical connection can be made with the mothership. Communicating the collected data to the mothership can be a significant problem. Data is gathered by the hydrophones at a relatively high rate. Data gathering is an intermittent process so that the average data rate, while being relatively high, is significantly less than the peak data rate.

In addition to the high data rates which must be employed, a significant problem with communications between a remotely operated semi-submersible vehicle and the mothership is the noisiness of the communications channel. Microwave communications pose problems due to multipath distortion from a few fixed reflectors that cause interfering signals. In water-borne applications, the common approach is to try to avoid these reflections by preventing the beam from intersecting the waters surface. In the case of a remotely operated semi-submersible vehicle, the transmitting antenna on the vehicle is necessarily very low to the surface of the water and makes prevention of the beam intersection with the water surface nearly impossible. Furthermore, there will nearly always be a large number of multiple paths as the surface of the water appears as a scintillating surface at the low look angles of typical antennas. In addition, obstacles which block the line of sight between the mothership and the remotely operated vehicle will also interrupt the transmission of data. Such objects can include, for example, other ships and offshore drilling rigs. Shorter outages can also occur due to wave action and ship motion.

Any loss of data due to an outage renders the collected data nearly useless. Since it is generally not feasible to store all collected data in the remotely operated vehicle until it recovered by the mothership, it is necessary to devise a communication system that detects outages in the communication channel and recovers from them.

It would therefore be desirable to provide a data communications system suitable for transmitting data between a remotely operated seismic vehicle and a mothership which has the capacity to handle the high rates of data found in hydrophone streamers. It would further be desirable to provide such a communication system which can transfer data correctly over a noisy channel, and which can recover from communications channel outages.

SUMMARY OF THE INVENTION

It is therefore an object of the present invention to provide a communications system suitable for transmission of seismic hydrophone data from a remotely operated vehicle to a mothership surface vessel.

It is another an object of the present invention to provide such a communications system which can transfer data correctly over a noisy channel, and which can recover from communications channel outages.

It is yet another object of the present invention to provide such a system which insures the correctness of the transmitted data.

It is a further object of the present invention to provide such a system which automatically handles communications channel interruptions in such a manner that no data is lost.

Therefore, according to the present invention, a system is provided for communicating high bandwidth data from a remotely operated semi-submersible vehicle to a mothership surface vessel. The data transmitted from the remotely operated vehicle is blocked and coded to improve the accuracy of the transmission. The remotely operated vehicle contains a large buffer for temporarily storing hydrophone data until it has been transmitted and acknowledged by the mothership. Each transmitted block is acknowledged by the mothership when it has been correctly received. Incorrect or missing acknowledgment signals indicates that some type of interference or outage has occurred in the communications channel. In such an event, the remotely operated vehicle can continually resend the recently transmitted data until receipt of correct acknowledgment signals indicate that the communications channel has been restored.

BRIEF DESCRIPTION OF THE DRAWINGS

The novel features believed characteristic of the invention are set forth in the appended claims. The invention itself however, as well as a preferred mode of use, and further objects and advantages thereof, will best be understood by reference to the following detailed description of an illustrative embodiment when read in conjunction with the accompanying wherein:

DESCRIPTION OF THE PREFERRED EMBODIMENT

Figure 1:
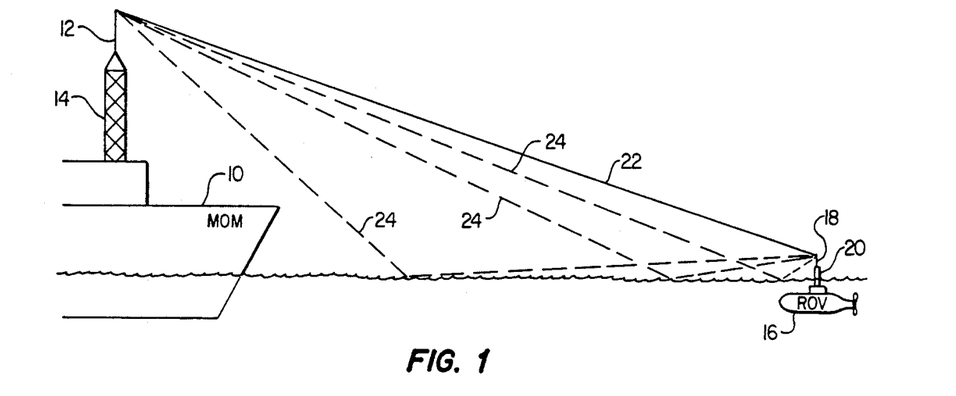
FIG. 1 is a diagrammatic view of a remotely operated semi-submersible vehicle communicating with a mothership surface vessel.

FIG. 1 illustrates diagrammatically the marine vessels involved in the forthcoming description. A mothership 10 is a surface vessel typically containing extensive, sophisticated electronics. The electronics include computerized data handling systems and radio communications systems. The mothership typically has several different radio antennae for various types of communication, and these are collectively represented diagrammatically by communications antenna 12 mounting on tower 14. The effect of mounted antenna 12 on tower 14 is to raise the antenna 12 off the surface of the water.

A remotely operated semi-submersible vehicle (ROV) 16 operates up to several miles from the mothership 10. ROV 16 has a communications antenna 18 mounted on a mast 20. The ROV 16 is relatively small, and antenna 18 is located within a few meters of the water's surface.

Line 22 represents a direct line of sight between the mothership antenna 12 and the ROV antenna 18. The high radio frequencies which will be used for data transfer operate as line of sight transmitters. Since the ROV antenna 18 is so low to the water's surface, multiple signal paths caused by signal reflections off the water surface will occur. Three such paths are shown as lines 24. Since the surface of the water continuously changes, the various multiple paths are short lived and changing.

Figure 3:
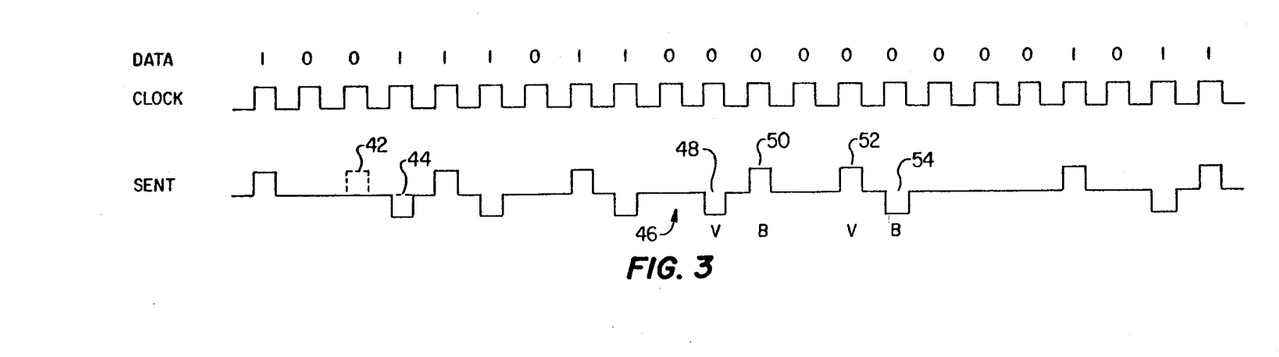
FIG. 3 is a timing diagram illustrating a preferred transmission technique.

Generally, multipath distortion in high frequency communications is avoided whenever possible. However, for the purposes of present invention, the transmission pattern of ROV antenna 18 is selected to have a large vertical lobe. This causes a large number of multiple signal paths between the ROV antenna 18 and the mothership antenna 12 to occur. The large number of multiple signal paths, combined with the changing water surface, tend to cancel out when the communications technique described in connection with FIG. 3 is used. Thus, rather than attempting to communicate between the mothership 10 and ROV 16 with a difficult to maintain narrow beam, the preferred embodiment utilizes multipath distortion in a positive manner to minimize the amount of overall noise in the signal.

Since the communications path between the mothership 10 and ROV 16 is low to the water's surface, it is susceptible to interruption by objects near the surface of the water. Objects such as ships, drilling platforms and even small boats can create outages in the communications channel between the mothership 10 and the ROV 16. It is necessary for a data communications system to be able to detect these outages and recover from them.

The preferred communications system described in more detail below has the ability to correctly handle significant interruptions in the communications channel. The systems design described below is able to maintain accurate communications between the ROV 16 and the mothership 10 even with complete communications channel outages of a ten second duration which occur once every minute. In addition, channel outages ranging from a 150 MS −300 msec, occurring once every second, are adequately handled.

Figure 2:
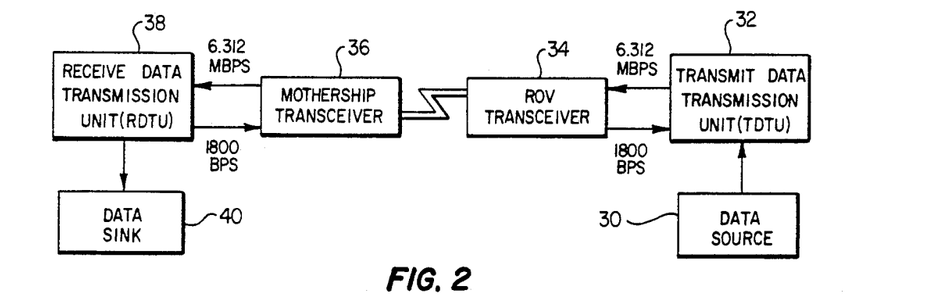
FIG. 2 is a block diagram of an embodiment of a communication system according to the present invention.

Referring to FIG. 2, a block diagram is shown of a preferred system for transmitting data from the ROV 16 to the mothership 10. The hydrophone streamer (not shown) towed by the ROV 16 is considered by the system to be a data source 30. Data collection from hydrophones is well known in the art, and data source 30 can be, for example, a Digicon system. Such a system, as is typical of collection using hydrophone streamers, generates data sporadically at a peak rate of 600 Kbytes/sec (5 Mbits/sec) and at a net average rate of 2.5 Mbits/sec.

Data source 30 passes data at the average rate of 2.5 Mbits/sec to a transmit data transmission unit (TDTU) 32. The TDTU 32 buffers received data and formats transmissions to the mothership 10. Data is sent from the TDTU 32 to an ROV transceiver and antenna system for transmission to the mothership 10. Data is received by a mothership antenna and transceiver 36, and transmitted to a receive data transmission unit (RDTU) 38. The RDTU 38 insures the accuracy of the data, and sends it to a data sink 40. Data sink 40 is typically a nonvolatile mass storage device capable of holding extremely large amounts of information. The data in the sink 40 can be retrieved at a later time for analysis.

In the preferred embodiment, data is transmitted from the ROV transceiver 34 to the mothership transceiver 36 at a rate of 6.312M bits/sec, which is the Bell System T2 rate. Data can be transmitted over a microwave communications channel at approximately 2.5 GHz using transceivers known in the art, such as, for example, a Terracom TCM-610 digital radio. Since the T2 rate is used for the radio transmission, data is transmitted from the TDTU 32 to the ROV transceiver 34, and from the mothership 36 to the RDTU 38, at the same T2 rate.

A reverse communications channel is necessary in order for the RDTU 38 to provide control signals to the TDTU 32. This reverse channel is used for the generation of acknowledgment signals from the mothership 10 which are used by the TDTU 32 to determine that transmitted data has been received accurately. The return communications channel can be a low data rate channel, and is 1800 bits/sec in the preferred embodiment.

A transmission technique which is suitable for use over water is bipolar alternate mark inversion. Bipolar transmission gives a DC offset of zero. Alternate inversion involves the sending of a pulse of either positive or negative polarity each time a 1 is transmitted. No pulse is sent for transmission of zeros. In a preferred embodiment, six zero suppression (described below) is used to allow the receiver to stay in sync with the communications channel.

The preferred technique is illustrated in FIG. 3. Each time a 1 data bit is sent, a pulse of the opposite polarity as the previously transmitted pulse is transmitted. If two consecutive pulses of the same polarity are received, a violation occurs. Such an example is shown as pulse 42. At location 44, if channel noise causes a pulse not to be transmitted a violation also occurs. The radio receiver can use the occurrence of two consecutive pulses having the same polarity as an indication of an error in data transmission.

The six zero suppression technique used to maintain sync between the transmitter and the receiver is also illustrated in FIG. 3. A string of 6 zeros is transmitted beginning at point 46 on the timing diagram. When the transmitter determines that it has 6 consecutive zeros to transmit, it inserts a preselected pattern of polarity violating pulses in order to signal such an occurrence. When a string of 6 zeros is transmitted, a polarity violating pulse 48 is transmitted for the second zero. A balancing pulse 50 of the opposite polarity is transmitted for the next data bit. Two zeros later, a second polarity violating pulse 52 is transmitted, followed by a balancing pulse 54.

When the receiver detects this particular pattern of violating and balancing pulses, it determines that the six bits just received are all zeros. If 12 or more consecutive zeros are transmitted, the pattern is repeated. Long patterns of repeated 1's do not cause a problem, as pulses of opposite polarity are transmitted for each data bit.

Figure 4:
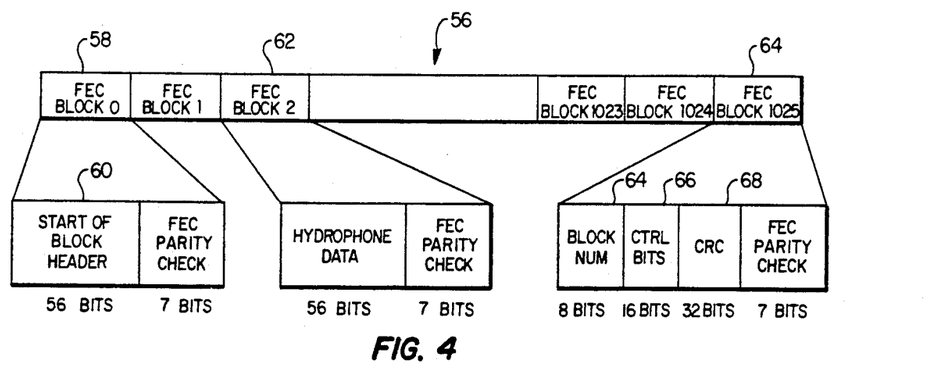
FIG. 4 illustrates a preferred transmission block structure.

As is typically the case with serial data communications, the data transmitted from the ROV 16 to the mothership 10 is organized into packets, or blocks, for transmission. A preferred block organization is illustrated in FIG. 4. Data is transmitted in transmission blocks 56, and each transmission block is subdivided into 1026 FEC blocks. Each FEC block is capable of a limited amount of error correction. Each FEC block is preferably 63 bits long, and contains 56 data bits. The data in the block is encoded using a (63, 56) Hamming code, which is capable of correcting all one bit errors within the block, and 2 bit burst (2 consecutive bits) errors.

The first FEC block 58 in the transmission block 56 contains a start of block header 60. This header is a predetermined bit pattern which is recognized by the receiver, and is used to synchronize a cyclic redundancy check (CRC) generator within the TDTU 32. Start of block header 60 is not included in the CRC.

The next 1024 FEC blocks contain hydrophone data and parity information as illustrated by FEC block 62. The last FEC block 64 within transmission block 56 contains CRC and identification information for the entire transmission block 56. These preferably include an 8 bit block number 64, 16 bits of control information 66 for passing messages from the ROV 16 to the mothership 10, and 32 CRC bits 68. FEC block 64 is encoded with 7 bits just as are the rest of the FEC blocks.

Using the block sizes just described, a transmission block 56 contains 64,638 bits and is transmitted in 10.24 msec. A 12 bit acknowledgment signal is preferably used on the reverse channel which is transmitted in 6.67 msec using the 1800 bits/sec reverse communications channel. Thus, the time required to acknowledge transmission of a single data block is less than the time required to transmit such a block. This prevents data from being lost due to the inability to transmit acknowledge signals as fast as the data is being transmitted.

TDTU 32 transmits data by transmission blocks 56, and awaits acknowledgment of each block. If an acknowledgment is not received, or an incorrect acknowledgment is received, it is assumed that an error has occurred or that the communications channel has been interrupted. In such cases, the TDTU 32 will back up two transmission blocks 56, and resend data until a proper acknowledgment is received from the RDTU 38.

In operation, TDTU 32 sends transmission blocks to the RDTU 38. It watches for an acknowledgment on the reverse channel during transmission of the next block 56 on the forward channel. The following three rules describe briefly what the TDTU does after transmission of some block n:

(1) Block (n+1) is sent next if the data buffer contains enough data and an acknowledgment signal was received on the reverse communications channel for block (n-1) during transmission of block n.

(2) Block (n-1) is re-transmitted if a valid acknowledgment for block (n-1) was not received during transmission of block n.

(3) If a proper acknowledgment was received, and the data buffer does not have enough data for transmission of complete transmission block 56, no data is sent.

When the RDTU 32 receives an error-free block, it responds with an acknowledge-even or acknowledge-odd acknowledgment signal. Acknowledge-even is used when the last correctly received block had an even number, and acknowledge-odd is used when the last received block had an odd block number. If the block number of the last received block is one greater than that of the previously accepted block, such block is accepted and sent to the data sink 40. Out of sequence blocks, as indicated by their block numbers, are discarded.

Figure 5:
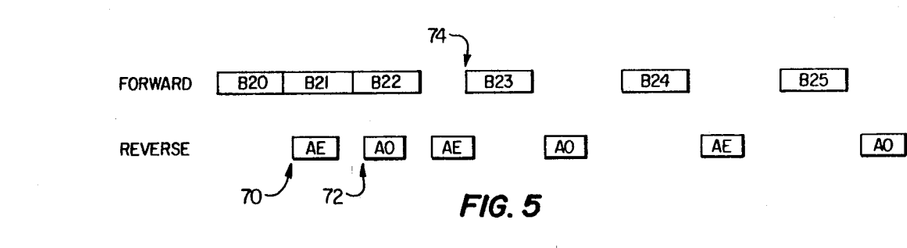
FIGS. 5 and 6 are timing diagrams illustrating transmission and acknowledgment of data blocks according to the preferred embodiment.

FIG. 5 gives an example of an error-free data transmission sequence. Transmission blocks on the forward communications channel are numbered B20 thru B25. Acknowledgment messages on the reverse channel are shown as acknowledge-even (AE) or acknowledge-odd (AO).

In this example, after block B20 has been transmitted, data remains within the buffer within the TDTU, so block B21 is transmitted immediately thereafter. An AE acknowledgment for block B20 is transmitted on the reverse channel after a small time delay 70. This delay, know as a reverse channel propagation delay, is caused by the required checking of the received data by the RDTU 38 in order to determined whether the proper block was correctly received. After B21 has been correctly received, an acknowledge-odd signal is transmitted on the reverse channel beginning at time 72.

In the example of FIG. 5, transmission blocks B20, B21, B22 are transmitted with no intervening delay. After completion of block B22, not enough data resides in the buffer to form a next complete transmission block. Therefore, transmission block B23 is not transmitted until time 74. Since data can be transmitted at a greater rate than the 2.5 Mbits/sec average rate which is provided by the data source 30, following blocks B24 and B25 are transmitted after suitable delays. This is the usual method of operation encountered when data is transmitted with no errors.

Figure 6:
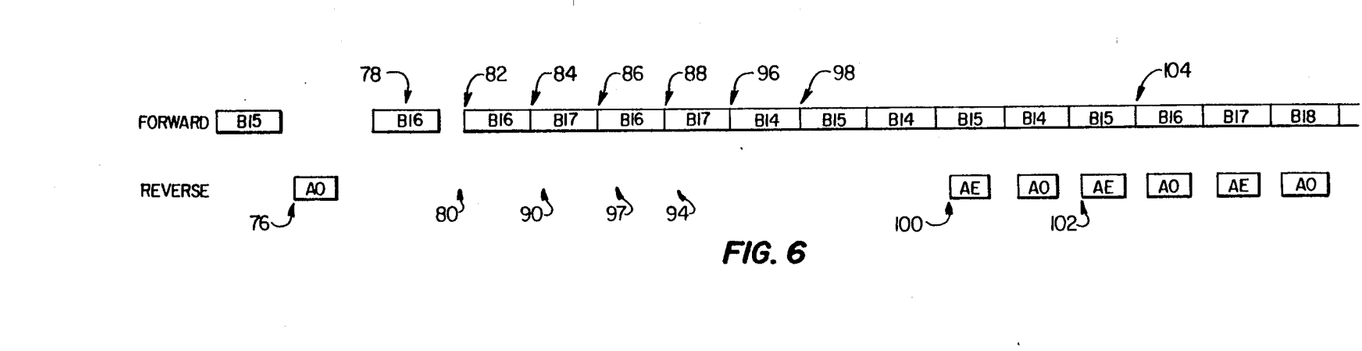

FIG. 6 illustrates a preferred operation for the TDTU 32 when a communications channel interruption is encountered. As seen by the TDTU 32, this will be experienced as receipt of invalid acknowledge signals, or none at all. A flowchart showing detailed control of the TDTU 32 will be described further in connection with FIG. 10.

The general rule followed by the TDTU 32 is to utilize the three transmission rules set forth above. If three consecutive invalid acknowledgment signals are received, then an assumption is made that the communications channel has been interrupted. At this point, the TDTU 32 begins re-transmitting the last two blocks which were successfully acknowledged. These two blocks will be repeated until three successive acknowledge signals have been received, at which time normal transmission will resume. The RDTU 38 discards any data blocks which are sent twice as a result of error recovery procedures.

In the example of FIG. 6, transmission of data blocks has occurred for some time without any interruption. At this point, the data buffer does not contain enough data to send a new transmission block 56 immediately after the previous block finishes transmission. Block B15 is correctly sent, and acknowledged beginning at time 76. Block B16 is transmitted at time 78, with an acknowledge signal expected beginning at time 80. At this point, block B17 is not yet completed and ready for transmission. Since no acknowledgment was received beginning at time 80, block B16 is re-transmitted beginning at time 82. Due to a communications channel outage, either in the forward data channel or the reverse channel, or both, no acknowledgment signals are received by the TDTU 32 for some period of time. Block B17 is ready at time to 84, so is transmitted immediately after block B16. Block B16 and B17 are re-transmitted, alternately, at times 86 and 88 respectively. Acknowledgment signals are expected, and not received, at times 90, 92, and 94. The three consecutive missing responses 90, 92, and 94 cause the TDTU 32 to back up to the last two successfully transmitted blocks. Thus, at time 96 block B14 is transmitted, followed by B15 at time 98. Block B14 and B15 are continuously transmitted in such an alternating matter until three consecutive correct acknowledgment signals have been received, indicating that the communications channel is once again operational. The first acknowledge signal is received beginning at time 100, and the third consecutive such signal is received beginning at time 102. Thus, beginning at time 104, transmission blocks which have been accumulating in the TDTU 32 buffer are transmitted consecutively.

Figure 7:
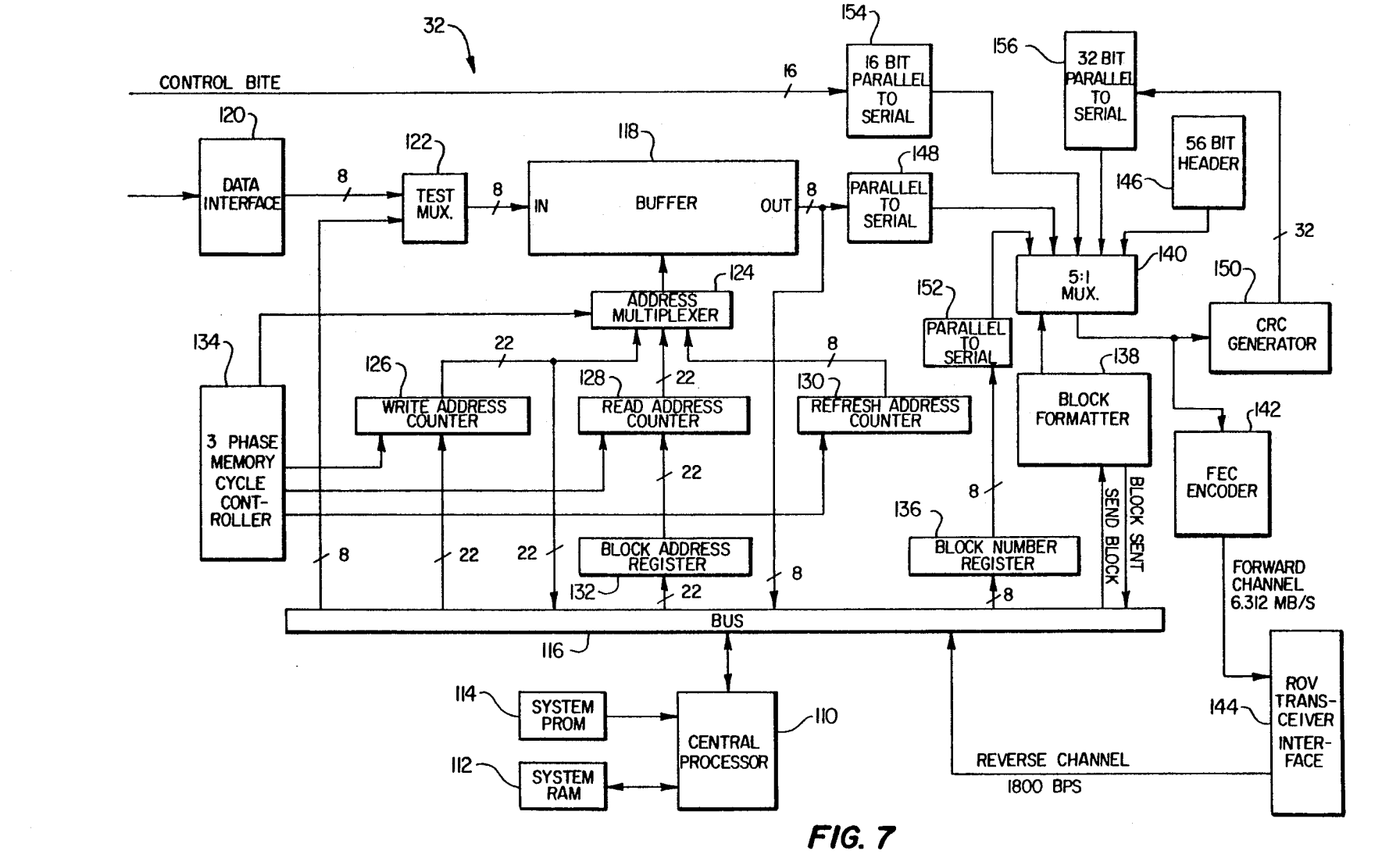
FIG. 7 is a block diagram of a communications transceiver suitable for use on a our remotely operated vehicle.

Referring to FIG. 7, a preferred implementation is shown for the TDTU 32. A central processor 110 accesses a system RAM 112 and a system ROM 114. System ROM 114 is preferably an EPROM or EEPROM. System ROM 114 contains programs with which central processor 110 controls operation of the TDTU 32, and system RAM 112 is used for system storage. Central processor 110 communicates with the remainder of TDTU 32 on bus 116.

Operation of TDTU 32 centers data stored in buffer 118. This is preferably a 4 Mbit buffer utilizing dynamic RAM. Data is input to buffer 118 from data interface 120 through test multiplexer 122. Data interface 120 receives hydrophone data from the streamer. Test multiplexer 122 normally selects data from interface 120 before writing it to buffer 118, but can be switched to communicate directly with central processor 110 through bus 116 when the TDTU 32 is placed into a test mode. This allows testing of TDTU 32 without actual acquisition of hydrophone data through interface 120.

Buffer 118 is addressed with the output of address multiplexer 124. At any given time, a selected address is obtain from one of three registers connected to multiplexer 124. These are a write address counter 126, a read address counter 128, and a refresh address counter 130. The write address counter 126 can be loaded with a selected value by central processor 110 thru bus 116. Read address counter 128 can be loaded with a selected value obtained from block address register 132, which is written to by central processor 110 on bus 116. Refresh address counter 130 is simply incremented, as it used solely for addressing DRAM rows in buffer 118 for refresh.

Operation of address multiplexer 124 and the counters 126, 128, 130 is controlled by memory cycle controller 134. A channel byte cycle consists of three sub-cycles; a read cycle, a write cycle, and a refresh cycle. Each of these sub-cycles corresponds to one actual cycle during which a memory reference, read, write or refresh, may be made to buffer 118. Memory controller 134 alternates the three types of accesses, performing a refresh during every channel byte cycle and a read and write only when they are needed. Each time a byte of data is read or written, the read address counter 128 or write address counter 126 is incremented as appropriate.

Block address register 132 is used by central processor 110 to set the starting address of the next block to be sent. This is calculated by adding the block length to the starting address of the previously transmitted block. The address in register 132 is loaded into counter 128 when transmission of a new block begins. Whenever a block must be resent, the starting address of such block is calculated and loaded in the block address register 132 and copied to read address counter 128.

Central processor 110 also places the block number of the block currently being transmitted into block number register 136. Central processor 110 also communicates with a block formatter 138 by signals SEND BLOCK and BLOCK SENT. SEND BLOCK is used by the central processor 110 to initiate transmission of a transmission block 56, and BLOCK SENT is used by the block formatter 138 to indicate that block sending is completed. Central processor 110 knows when buffer 118 contains enough data to send the next transmission block by monitoring the current value of write address counter 126. Since the value in this counter 126 is incremented by memory controller 134 every time a byte of data is written into buffer 118 from data interface 120, and the number of bytes in each block is known, central processor 110 can easily determine when buffer 118 contains at least enough data to send one transmission block 56.

Actual transmission of a block is handled by block formatter 138, which is a straightforward state machine. Block formatter 138 controls operation of a 5 to 1 multiplexer 140. Block formatter 138 causes 56 bits of serial data to be output from multiplexer 140, followed by 7 clocks during which no serial data is output. The output from the multiplexer 140 is connected to FEC encoder 142, which generates the seven parity bits used by the preferred encoding scheme and communicates serial data to an ROV transceiver interface 144. Interface 144 then communicates with the ROV transceiver 34.

Block formatter 138 uses multiplexer 140 to selectively connect serial data to FEC encoder 142 in order to properly assemble transmission blocks as is described in connection with FIG. 4. When a block is sent, a 56 byte serial header 146 is routed through multiplexer 140 to the FEC coder 142. After a seven clock cycle pause, 56 data bits are shifted out of parallel to serial converter 148 connected to buffer 118. As described above, at the end of each 56 bit block of hydrophone data, a seven clock hold is maintained while the FEC encoder 142 generates the parity bits. This occurs 1024 times, at which time all hydrophone data to be transmitted during a single transmission block 56 has been communicated to the FEC encoder 142. Each bit of hydrophone data is also sent to a CRC generator 150, which generates a 32 bit cyclic redundancy check as the data is being sent to the FEC encoder 142. In order to construct the last FEC block 64, the block formatter 138 shifts eight block number bits from parallel to serial converter 152. This is followed by 16 bits from parallel to serial converter 154. These 16 bits are not used directly by the data communication system, and can be used, for example, to transmit ROV position and operation information to the mothership 10. Next, the 32 CRC bits are shifted from parallel to serial converter 156, after which a seven clock pause occurs while FEC 146 encoder 142 generates the appropriate parity bits. At this time, the signal BLOCK SENT is used to indicate to central processor 110 that transmission of a block has been completed.

When no data block is being transmitted due to not enough data being in buffer 118, block formatter 138 causes a string of zeros to be sent to FEC encoder 142. Encoder 142 then outputs FEC blocks containing all zeros, which are encoded as described in connection with FIG. 3. This allows the TDTU 32 and the RDTU 38 timing to remain synchronized.

Since the data rate of the reverse channel is so low, central processor 110 is able to monitor it directly by interrupts transmitted over bus 116. This allows central processor 110 to perform the function of a UART on the reverse channel, which avoids the necessity for additional hardware for the reverse channel. Since transmission of a data block over the forward channel takes nearly eleven milliseconds, and transmission of an acknowledgment signal takes nearly seven milliseconds on the reverse signal channel, acknowledgment signals must be returned by the RDTU 38 relatively quickly after transmission of a datablock is completed. Preferably, transmission of the acknowledgment signal should be completed before completion of transmission of the following data block. Thus, an acknowledge signal should be received on the reverse channel within approximately 10 milliseconds after a transmission block has been sent. Central processor 110 can use the BLOCK SENT signal generated by block formatter 138 to begin timing this 10 millisecond period. Failure to receive a proper acknowledge signal over the reverse channel in a timely manner is considered to be an invalid acknowledgment, triggering resending of a data block.

Figure 8:
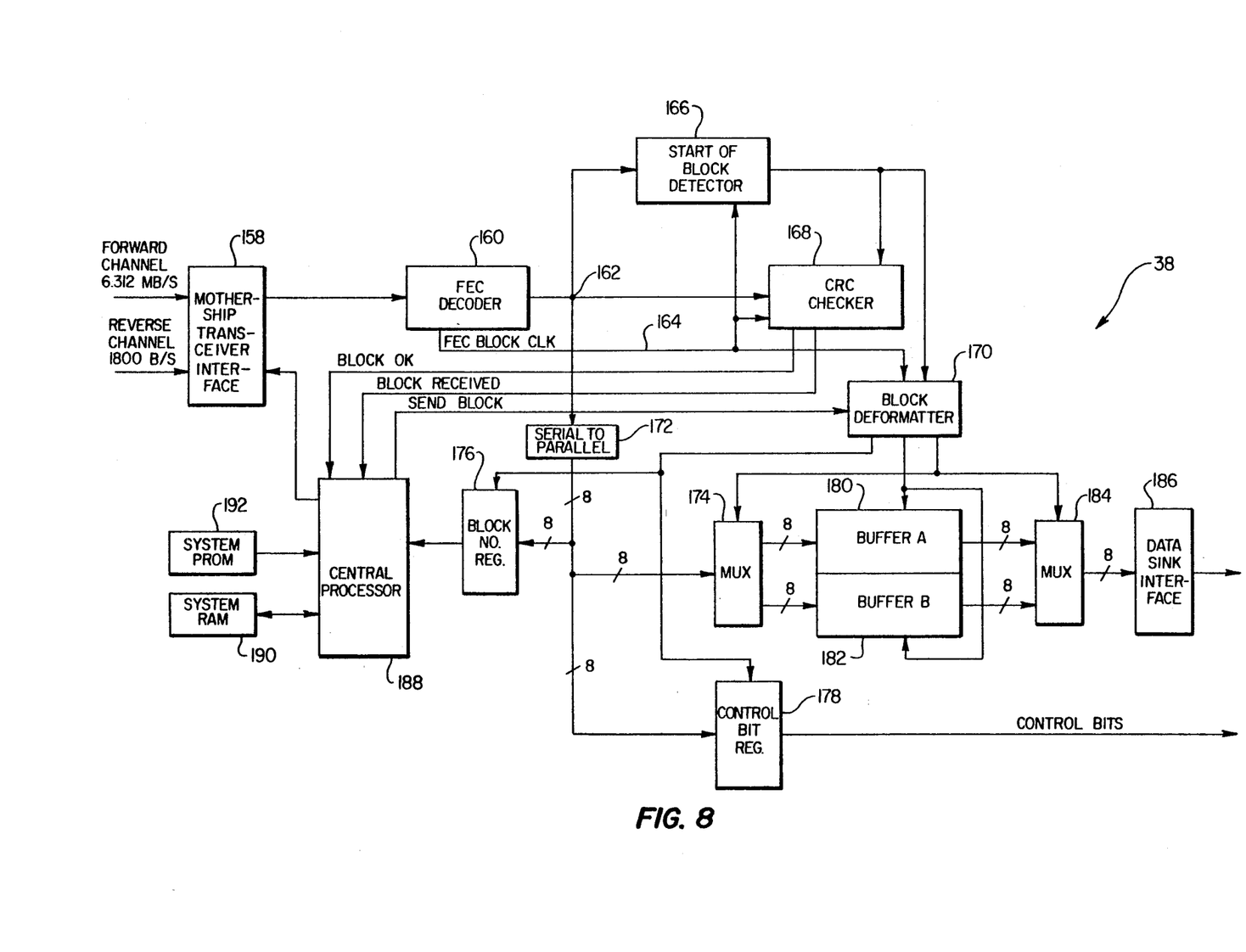
FIG. 8 is a block diagram of a communications transceiver suitable for use on a mothership.

A preferred implementation of the RDTU 38 is shown in FIG. 8. A transceiver interface 158 receives data from mothership transceiver 136, and sends reverse channel data thereto. Received data is communicated to an FEC decoder 160, which synchronizes with the FEC blocks transmitted by the TDTU 32, and performs error detection and correction using the seven parity bits transmitted with each FEC block. Data, with any one bit or two bit burst errors corrected, is shifted out of decoder 160 onto signal line 162. When synchronization has been obtained by FEC decoder 160, appropriate clock signals are output on clock signal line 164. Implementation details of FEC decoder 160 are described further in connection with FIG. 9.

Once the FEC decoder 160 has aligned with incoming FEC blocks, start of block detector 166 checks for the pre-determined start of block header 60. Once a start of block header has been detected, an enable signal is communicated to a CRC checker 168 and a block deformatter 170. CRC checker 168 performs a CRC check on all of the data in a transmission block 56, including the 32 CRC bytes 68 appended by the TDTU 32. CRC checker 168 generates a BLOCK RECEIVED signal at the end of a block, and a BLOCK OK signal when a transmission block is correctly received.

A serial to parallel converter 172 converts incoming serial data to byte-wide data. This data is sent to a multiplexer 174, a block number register 176, and a control bit register 178. The block number register 176 and control bit register 178 are enabled by the block deformatter 170 to receive the incoming block number and control bytes.

Block deformatter 170 also controls DATA BUFFER A 180, DATA BUFFER B 182, and output multiplexer 184. Multiplexers 174, 184 and data buffers, 180, 182 operate in concert to perform as a ping-pong buffer for receiving data from the serial to parallel interface 172. Each buffer 180, 182 can hold one transmission block of data. When one buffer is being written to, the other is being read from through multiplexer 184 by data sink interface 186. Data is transferred from the data sink interface 186 to the data sink 40 as described in connection with FIG. 2.

Central processor 188 utilizes the BLOCK OK and BLOCK RECEIVED signals from CRC checker 16 and the value stored in block number register 176 to determine whether a block has been correctly received. As described above, blocks which are received out of order, and previously correctly received blocks which are re-transmitted as part of error recovery, are not sent to the data sink. A SEND BLOCK signal provided by central processor 188 controls the block deformatter 170 to tell it whether or not to relay a received block from one of the buffers 180, 182 and communicate it to data sink interface 186.

Central processor 188 is connected to RAM 190 and ROM (preferably EPROM or EEPROM) for storage of data and programs. Central processor 188 generates the 1800 bytes/sec return channel acknowledgment signal on a serial output port, and communicates it to transceiver interface 158. Operation of central processor 188 will be described further in connection with FIG. 11.

Figure 9:
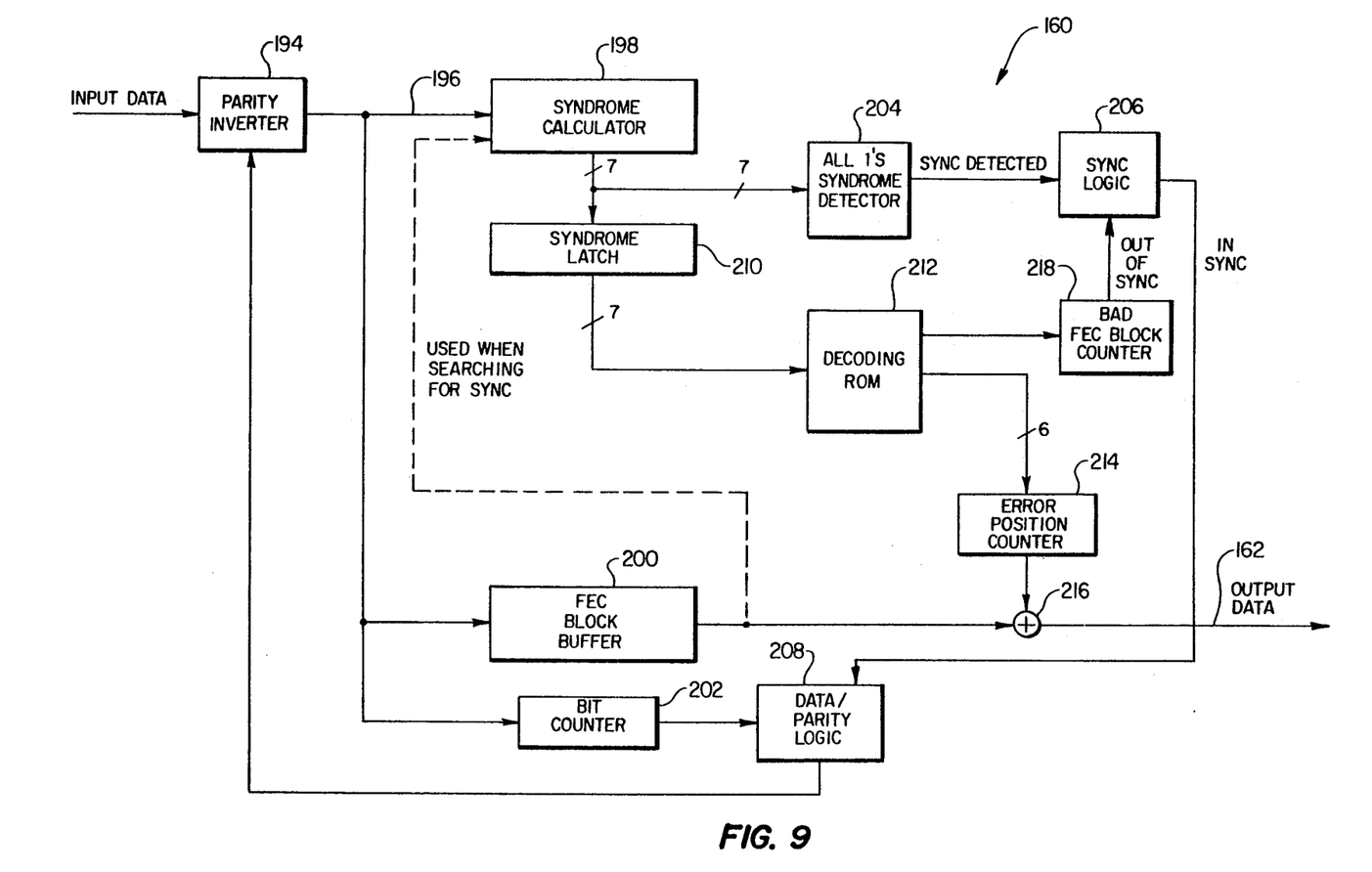
FIG. 9 is a diagram of a decoder used in FIG. 8.

Referring to FIG. 9, a preferred implementation for FEC decoder 160 is shown. Preferably, the parity bits generated by FEC encoder 142 (FIG. 7) are inverted after they are generated. This simplifies somewhat the FEC block synchronization performed by FEC decoder 160.

FEC decoder 160 receives incoming data at the T2 bit rate of 6.312 Mbits/sec. This incoming data is received by parity inverter 194, which re-inverts the parity bits when FEC block synchronization has been obtained. When such synchronization has not been obtained, no bits are inverted since the decoder 160 does not know which bits are the parity bits. Data is output from the parity inverter on signal line 196, and connected to a syndrome calculator 198, an FEC block buffer 200, and a bit counter 202. FEC block buffer 200 is a 63 bit shift register, which is the number of bits contained in an FEC block.

Decoder 160 synchronizes with the FEC blocks by feeding incoming data into the syndrome calculator 198, which calculates a value based on the previous 63 bits. In order to remove the effect of previous bits, the 64th previous bit is fed back into the syndrome calculator 198 as it is shifted out of the FEC block buffer 200. This causes a new syndrome to be calculated each time a bit is shifted into a calculator 198. Since the parity bits were inverted by the FEC encoder 142, an all 1's syndrome is calculated by syndrome calculator 198 when the decoder becomes aligned with an error free FEC block.

The all 1's syndrome is detected by detector 204, which generates a SYNC DETECTED signal connected to sync logic 206. An IN SYNC signal is applied to a data/parity logic block 208. Logic block 208 utilizes the IN SYNC signal and the output of bit counter 202 to control parity inverter 194 to invert the parity bits when FEC block synchronization has been obtained.

When synchronization has been obtained, since parity inverter 194 inverts the parity bits, syndrome calculator 198 will generate an all 0's syndrome when an error free FEC block is received. If an FEC block contains an error, a non-zero syndrome will be calculated. In any event, a syndrome generated for an FEC block is latched into syndrome latch 210. As the data for the next FEC block is read in, the just received FEC block is shifted out the block buffer 200. Syndrome latch 210 addresses a decoding ROM 212, which generates a signal indicative of the bit position which is in error. Error position counter 214 utilities this value to count the data bits as they are shifted out of FEC block buffer 200. The bit position which is in error, as shown by the output of ROM 212, is then exclusive OR'd with a 1 value, inverting it, in gate 216 before being transmitted to signal line 162.

When eight consecutively received FEC blocks contain errors, sync is assumed to have been lost. Each time an FEC block containing an error is detected, a signal is sent to a bad FEC block counter 218, which checks for consecutive blocks having errors. When this occurs, an OUT OF SYNC signal is sent to sync logic 206, which resets the IN SYNC signal to cause the decoder 160 to again search for FEC block synchronization.

Figure 10A:
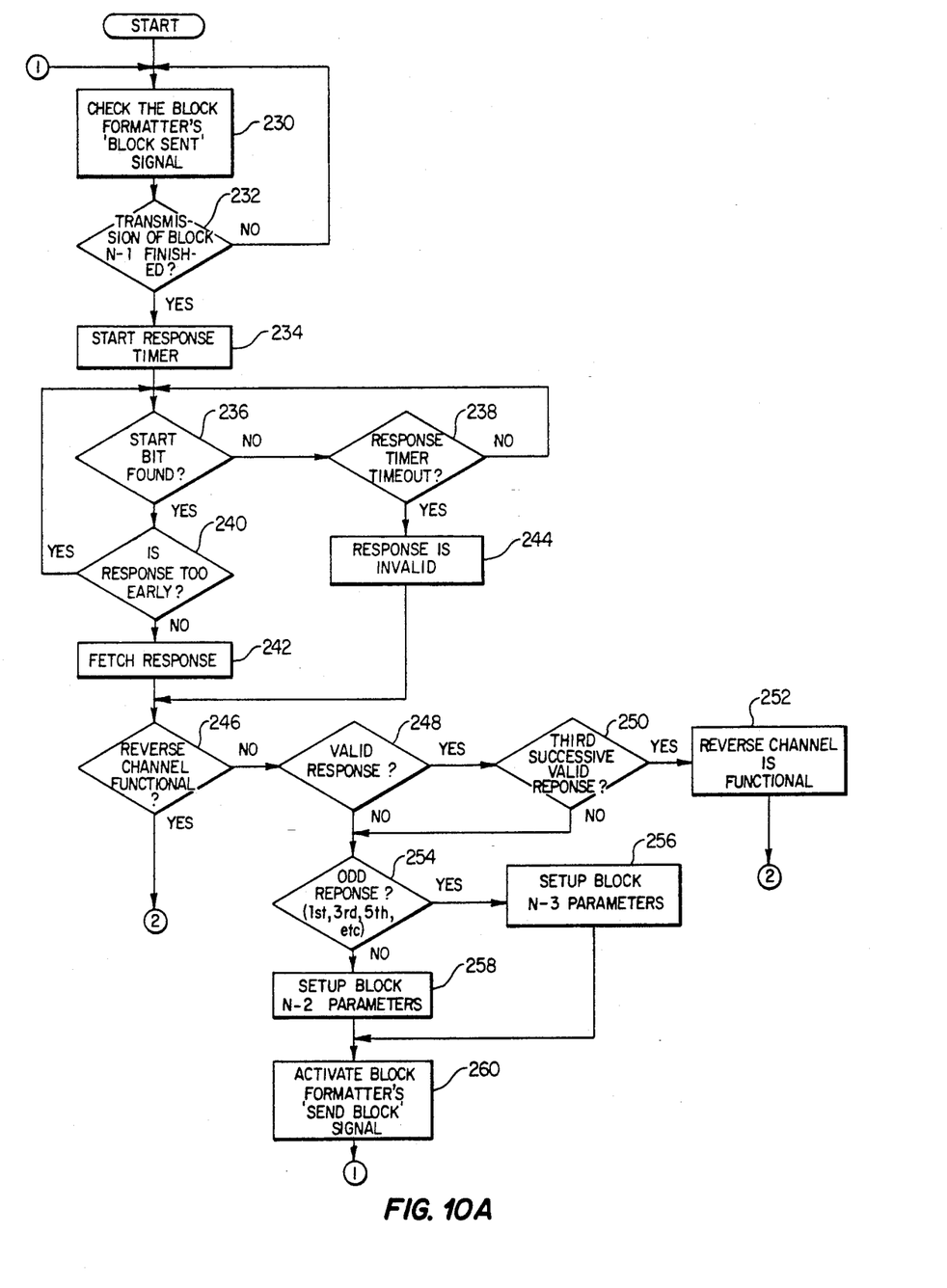
FIG. 10, comprised of FIGS. 10A and 10B, is a flow chart illustrating operation of the communication system on the remotely operated vehicle.
Figure 10B:
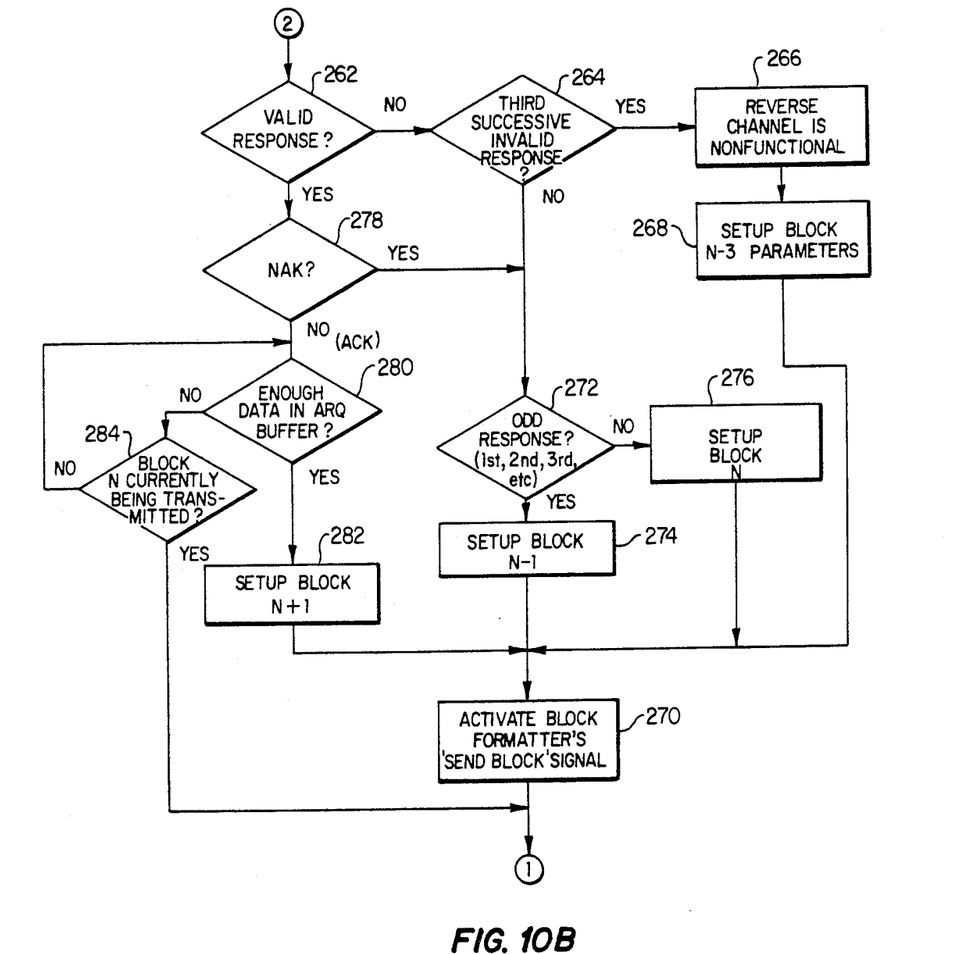

FIG. 10 is a flowchart indicating a preferred operation for the TDTU 32. A program corresponding to FIG. 10 is stored in system ROM 114 and executed by central processor 110 (FIG. 7).

In step 230, the block formatter's BLOCK SENT signal is checked to see if transmission of block (n-1) is completed (steps 230, 232). When transmission of a block has been completed, a timer for the response is started 234. A check is made to see if the start bit of the expected acknowledgment has been found 236. If not, and the response has not timed ut 238, control returns to step 236. If a start bit has been found, a check is made to see if this response is made too early 240. If so, control returns to step 236. If not, the response is fetched 246. If the response timer did time out in step 238, the response is considered invalid 244, and is treated as a non-acknowledgement signal.

Whether or not an acknowledgement signal is received, a check is made to see if the reverse channel is functional 246. This is stored as a flag by central processor 110. If the reverse channel is currently not functional, as indicated by the flag, a check is made to see whether a valid response has now been received 248. If so, and this is the third successive valid response 250, the reverse channel is determined to be functional 252 and the reverse channel flag is set. If a valid response is not received in step 248, or less than three successive valid responses have been received in step 250, a check is made to see whether this is an odd response 254. If so, the block address register 132 and other necessary information is set up to transmit block (n-3) 256. If this is an even response, parameters are set up to re-transmit block (n-2) 258. In either event, the SEND BLOCK signal is activated to cause the block formatter 138 to resend the chosen block, and control is returned to step 230.

If the reverse channel is functional, as indicated by a yes response to step 246 or reaching step 252, a check is made to see whether the currently received response is a valid response 262. If not, a check is made to see whether this is the third successive invalid response 264. If this is the case, the reverse channel is determined to be non-functional 266, and the reverse channel functional flag is reset. The transmission parameters for block (n-3) are set up to transmit such block 268, and the SEND BLOCK signal is activated 270. If, in step 264, this invalid response is not the third successive invalid response, a check is made to see if this is an odd response 272. If so, the parameters are set up to transmit block (n-1) 274, and if not the parameters are set up to transmit block n 276. In either case, the SEND BLOCK signal is then raised to the block formatter 270.

If a valid response was received in step 262, a check is made to see whether this was a NAK (NON-ACKNOWLEDGE) signal 278. If so, control passes to step 272. If not, a valid acknowledge signal has been received, and a check is made to see whether enough data exists in the buffer 280. If so, the parameters are set up to transmit block (n+1) 282, and control passes to step 270. If there is not enough data in the buffer to send another transmission block 280, a check is made to see if a block n is currently being transmitted 284. If not, a loop is made back to step 280. If so, control passes to step 230.

Figure 11:
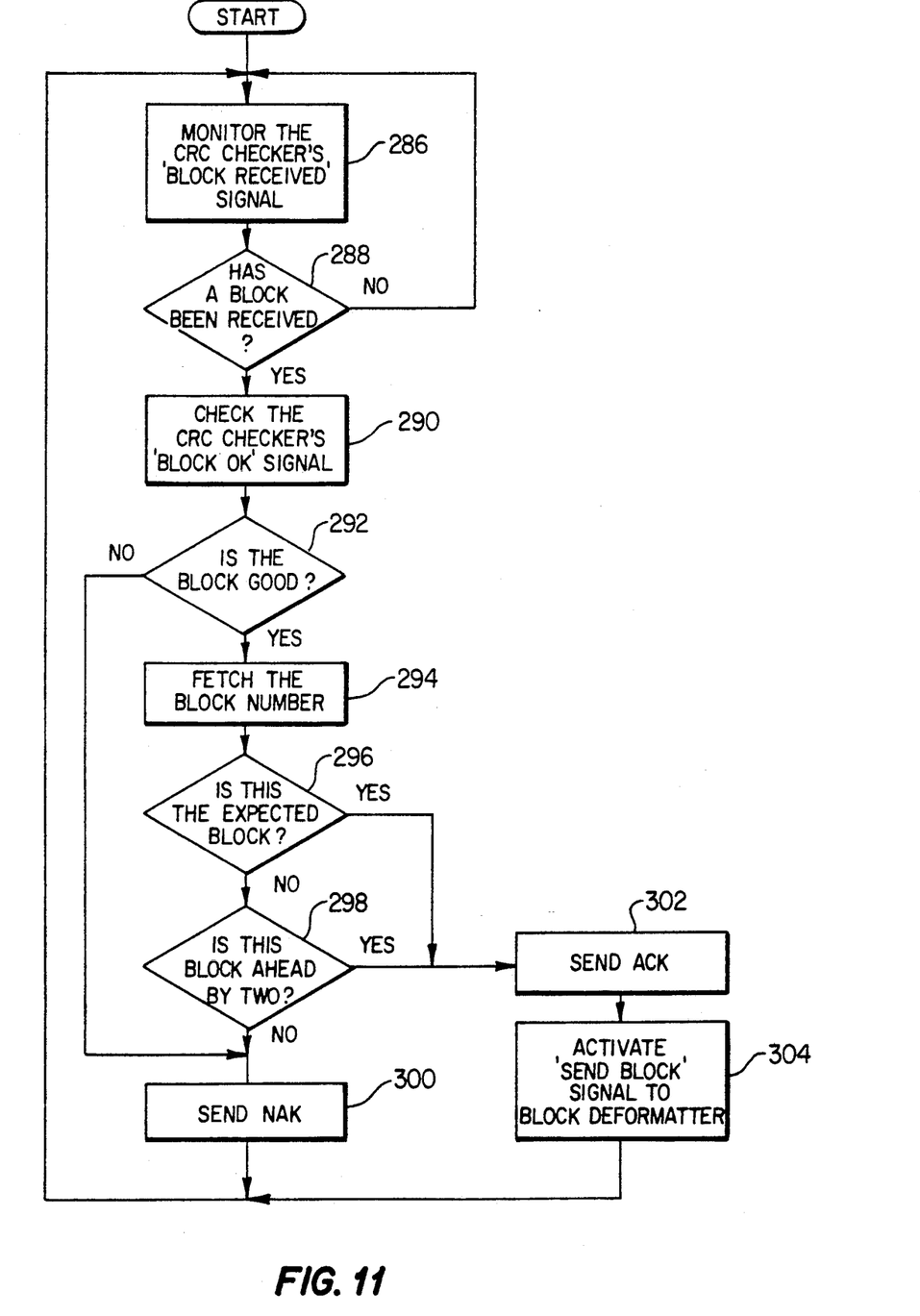
FIG. 11 is a flow chart illustrating operation of the communication system on board the mothership surface vessel.

FIG. 11 is a flowchart illustrating the preferred function for central processor 188 in the RDTU 38. This control is implemented as a program stored in system ROM 192.

The central processor 188 monitors the CRC checker's block receive signal 286. If a block has not been received 288, control loops back to 286. If a block has been received, the BLOCK OK signal is checked 290. If the block is good 292, the block number is fetched 294 from the block number register 176. A check is made to see if the received block number matches the expected block number 296. If not, a check is made to see whether this block is ahead of the expected block by exactly two 298. If not, a NAK signal is transmitted on the reverse channel 300, and control returns to step 286.

If the received block was not good in step 292, the NAK of step 300 is sent immediately. If the expected block was received in step 296, or the received block has a number exactly two larger than the expected value, an acknowledge signal is sent on the reverse channel 302. The acknowledge-odd or acknowledge-even signal will be sent according to the block number of the received block. The SEND BLOCK signal to the block deformatter 170 is then activated 304 to cause the just received block to be communicated to data sink 40 through the interface 186. Control then returns to step 286 to wait until the next block is received.

The purpose of making the test of step 298 is to compensate for the possibility of a specific error in the reverse channel transmission. The specific error addressed is the changing of NAK response into a proper acknowledgment response. If this should happen, the TDTU 32 will incorrectly believe that its last transmitted block was correctly received, and continue transmitting sequential blocks. Since the acknowledge signal only indicates whether the received block is odd or even, the TDTU 32 and RDTU 38 will become out of step, and the non-acknowledge signals transmitted by the RDTU 38 will be read as the proper acknowledgment signals by the TDTU 32. The tendency here will be for the RDTU 38 to patiently sit and wait for the erroneous block to be re-transmitted, while the TDTU 32 continues sending later blocks, and the two units will never link up. In order to prevent a lockup of the RDTU 38 by discarding all received data when this occurs, the RDTU 38 will began accepting data blocks when the number of the received block is two greater than the expected block. At this point, the RDTU 38 will re-synchronize its value of the expected block, and will have missed two blocks of transmitted data.

The system and communications method described above are suitable for use with a high bandwidth data channel in one direction, requiring only a very low rate reverse communications channel for transmission of acknowledgment signals. It is suitable for use in transmitting hydrophone data from a remotely operated vehicle towing a hydrophone streamer, and is extremely resistant to the types of noise and interference found under the difficult communications conditions incurred when using remotely operated semi-submersible vehicles. The described communications system is extremely resistant to errors, automatically resends erroneous information, and can determine when a communications channel interruption has occurred. Data transmission is resumed automatically when the communications channel is restored, and significant channel interruptions can occur without losing any hydrophone data.

While the invention has been particularly shown and described with reference to a preferred embodiment, it will be understood by those skilled in the art that various changes in form and detail may be made therein without departing from the spirit and scope of the invention.

What is claimed is:

1. A method for transferring data from a data generator to a data acceptor, comprising the steps of:
   (a) formatting the data into blocks within the data generator;
   (b) encoding the data blocks with error correcting information including a block number within the data generator;
   (c) transmitting the encoded data blocks sequentially;
   (d) receiving the transmitted blocks at the data acceptor;
   (e) decoding each received block to recover the data and check for transmission errors;
   (f) for each block received with no non-recoverable errors, returning an acknowledge-even signal or an acknowledge-odd signal, wherein the acknowledge-even signal is returned to the data generator in response to a properly received block having an even block number and the acknowledge-odd signal is returned in response to a properly received block having an odd number;
   (g) for each block for which an acknowledgement signal is not received by the data generator within a predetermined time period after completion of sending such block, assuming that such block was not properly received and resending such block until an acknowledgement signal is received;
   (h) for each block which is received with non-recoverable errors, a non-acknowledgement signal is returned to the data generator
   (i) retaining in a buffer at least 2 most recently previously acknowledged blocks are after they are acknowledged;
   (j) counting a number of consecutive non-acknowledgement signals received by the data generator;
   (k) when the number of received consecutive non-acknowledgement signals is at least 3, assuming that data transmission has been interrupted, and resending at least 2 previously sent blocks for which an acknowledgement signal was previously received until data transmission resumes; and
   (l) when at least 3 consecutive acknowledgement signals have been received after data transmission has been interrupted, assuming that data transmission has been restored and resending all blocks for which an acknowledgement signal has not been received.

2. The method of claim 1, wherein the acknowledge-even signal is returned in response to an odd numbered block have non-recoverable errors and the acknowledge-odd signal is returned to in response to an even numbered block having non-recoverable errors, and wherein receipt of an acknowledge-even signal where acknowledge-odd was expected or an acknowledge-odd signal where acknowledge-even was expected by the data generator is treated as a non-acknowledgement signal.

3. The method of claim 2, wherein receipt by the data acceptor of a block which has not yet been correctly received and which has a number which is out of sequence causes the data acceptor to generate a non-acknowledgement signal.

4. The method of claim 3, wherein receipt of a block having a number which is exactly two larger than the next expected block number causes the data acceptor to accept such block as a valid block and reset the sequence of received block numbers.

5. The method of claim 1, wherein data is transmitted from the data generator to the data acceptor over a high bandwidth forward communications link, and acknowledgement signals are returned to the data generator over a low bandwidth reverse communications link.

6. The method of claim 5, wherein both communications links include the transmission of information using electromagnetic radiation.

7. The method of claim 6, wherein the transferred data comprises hydrophone data.

8. The method of claim 7, wherein the data generator is a remotely operated marine vehicle towing an array of hydrophones, and the data acceptor is a marine vehicle containing mass storage facilities for storing the hydrophone data.

9. The method of claim 8, wherein $j=8$.

10. A method for transferring data from a data generator to a data acceptor, comprising the steps of:
(a) formatting the data into blocks within the data generator each block having a plurality of sub-blocks;
(b) encoding the each sub-block independent error correction information within the data generator with the first sub-block within each data block having a start of block header;
(c) transmitting the encoder data blocks sequentially;
(d) receiving the transmitted blocks at the data acceptor;
(e) decoding each received block to recover the data and check for transmission error;
(f) determining when the data acceptor is not synchronized with the data generator and scanning incoming data until alignment with a sub-block is obtained;
(g) examining each received sub-block for the start of block header, whereby the beginning of a data block is indicated;
(h) when a preselected number j of sub-blocks are received with errors, assuming that synchronization has been lost and restarting said scanning step until the data acceptor is synchronized with the data generator;
(i) for each block received with no non-recoverable errors, returning an acknowledgement signal from the data acceptor to the data generator; and
(j) for each block for which an acknowledgement signal is not received by the data generator within a time period less than the time required to transmit one encoded data block after completion of sending such block, assuming that such block was not properly received and resending such block until an acknowledgement signal is received.

11. The method of claim 10, wherein data is transmitted from the data generator to the data acceptor over a high bandwidth forward communications link, and acknowledgement signals are returned to the data generator over a low bandwidth reverse communications link.

12. The method of claim 11, wherein both communications links include the transmission of information using electromagnetic radiation.

13. The method of claim 12, wherein the transferred data comprises hydrophone data.

14. The method of claim 13, wherein the data generator is a remotely operated marine vehicle towing an array of hydrophones, and the data acceptor is a marine vehicle containing mass storage facilities for storing the hydrophone data.

15. A system for transmitting data from a remote collection system to a central collector, comprising:
(a) a data source;
(b) a block formatter for formatting data received from said data source into blocks and adding error correction information thereto;
(c) a decoder for extracting data from the data blocks;
(d) a communications link for bi-directionally transferring information between said block formatter and said decoder, wherein data blocks are transmitted over said communications link;
(e) an acknowledgement generator connected to said decoder for generating an acknowledge-even signal if an even numbered block is correctly received and an acknowledge-odd signal as a non-acknowledgement signal otherwise, and generating an acknowledge-odd signal if an odd numbered block is correctly received and an acknowledge-even signal as a non-acknowledgement signal otherwise; and
(f) an acknowledgement receiver connected to the block formatter for receiving the acknowledgement and non-acknowledgement signals over said communications link, wherein said acknowledgement receiver causes any data blocks to be resent for which an acknowledgement signal is not received.

16. The system of claim 15, wherein each data block comprises a plurality of sub-locks, and wherein said decoder includes;
a synchronizer for aligning said decoder with the sub-blocks by generating a syndrome signal indicative of receipt of an error-free sub-block, wherein said decoder synchronizes with the data blocks by searching for a start of block header after sub-block alignment has been obtained.

17. The system of claim 15, wherein said communications link comprises:
a remote transceiver connected to said block formatter and said acknowledgement receiver on the remote collection system;
a central transceiver connected to said decoder and said acknowledgement generator on the central collector; and
modulated electromagnetic radiation transferred between said remote transceiver and said central transceiver.

18. The system of claim 17, wherein the remote collection system is a marine vessel, the central collector is a marine vessel, and said modulated electromagnetic radiation passes over water.

19. The system of claim 18, wherein multiple signal paths occur between said remote transceiver and said control transceiver due to reflection from the water's surface, and wherein bipolar alternate mark inversion encoding is used to transmit electromagnetic radiation between said transceivers.

20. The system of claim 18, wherein the remote collection system vessel is a remotely operated semisubmersible vehicle towing a hydrophone array, and wherein the transmitted data includes hydrophone data.

\* \* \* \* \*